United States Patent Office 3,525,199
Patented Aug. 25, 1970

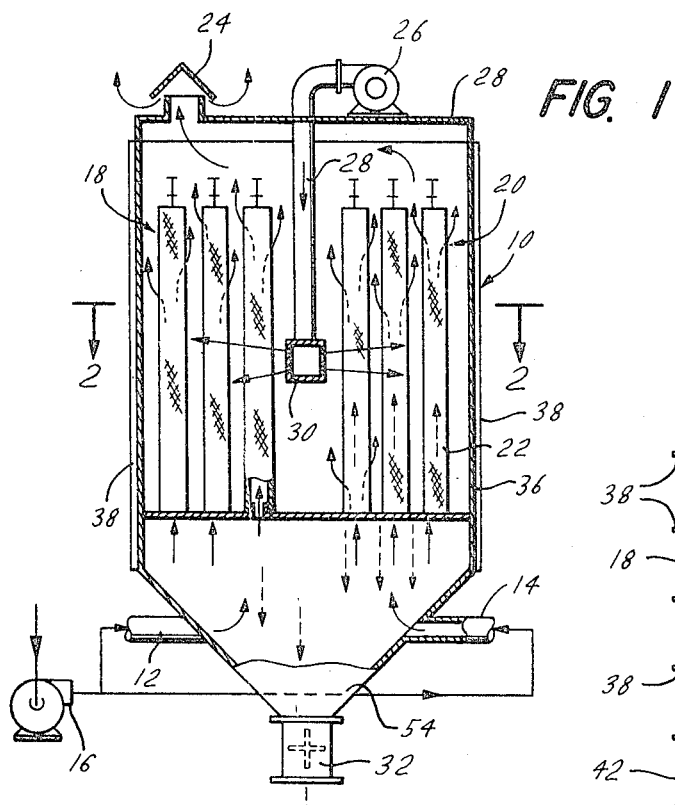
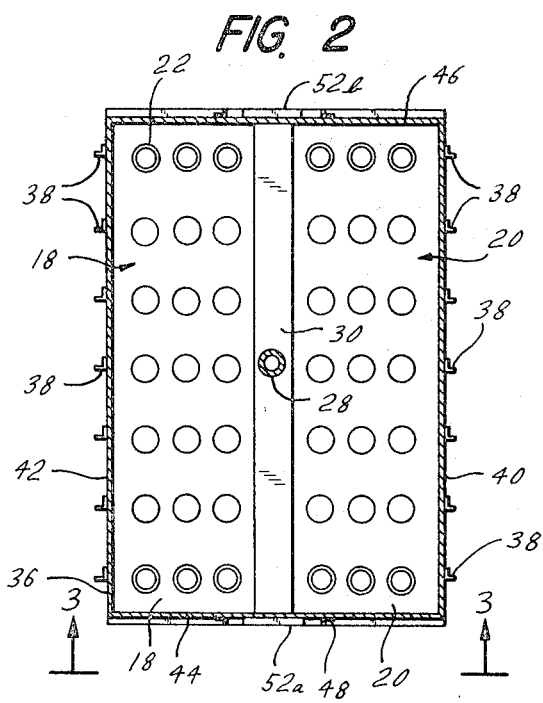
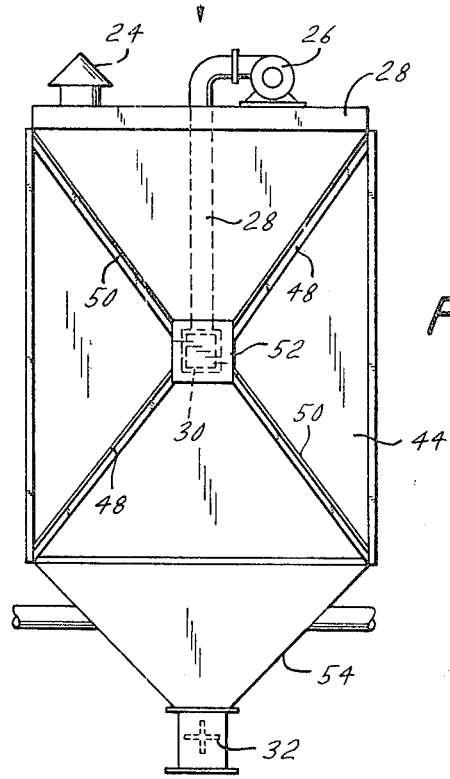

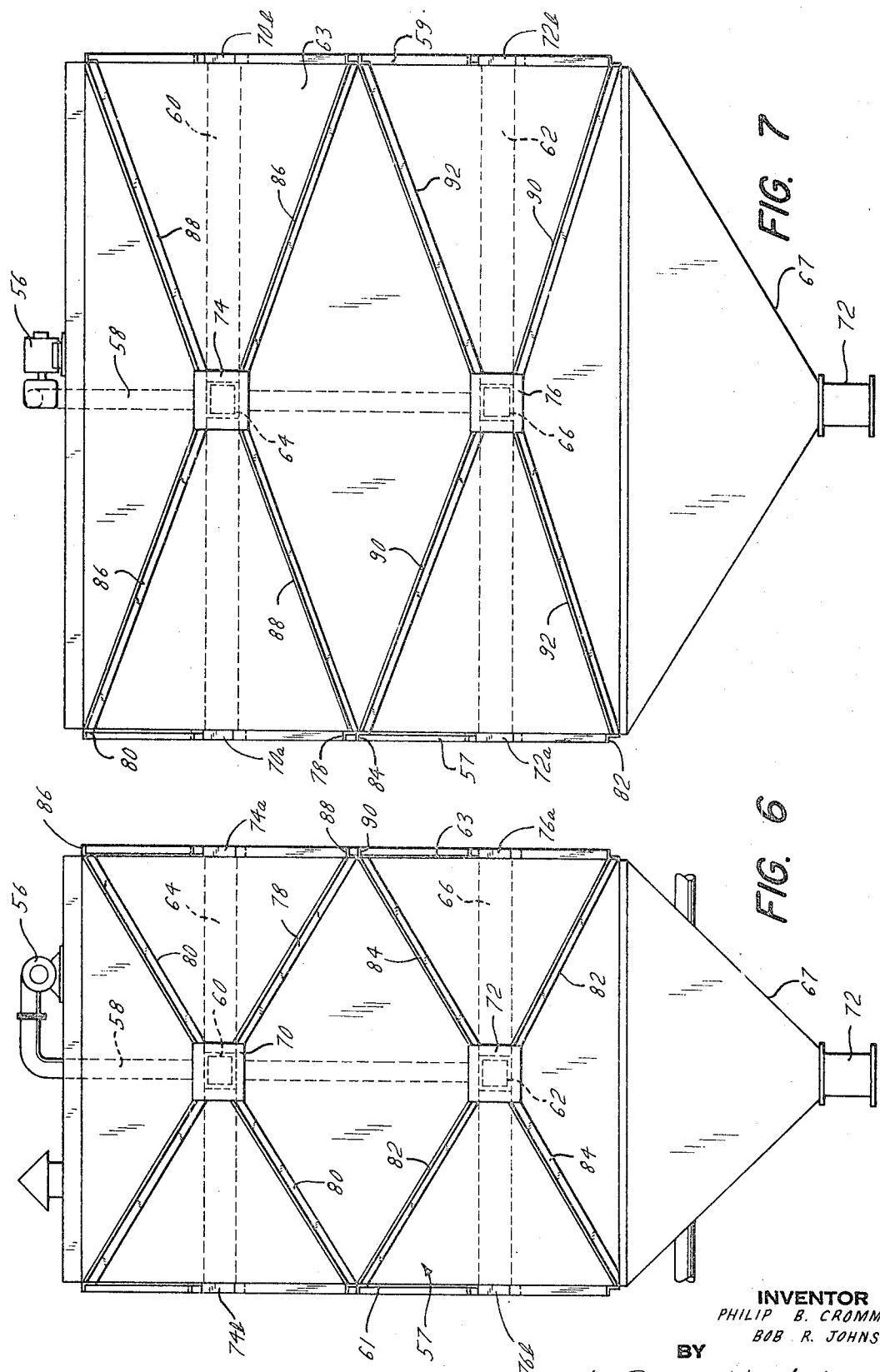

3,525,199
SYSTEM INTEGRATING BAG FILTER SHAKE MANIFOLD WITH CASING STRUCTURAL SYSTEM
Philip B. Crommelin, Jr., Bound Brook, and Bob R. Johnson, Flemington, N.J., assignors to Research-Cottrell, Inc., Bridgewater Township, N.J., a corporation of New Jersey
Filed May 8, 1968, Ser. No. 727,635
Int. Cl. B01d 46/04
U.S. Cl. 55—302          2 Claims

ABSTRACT OF THE DISCLOSURE

A dust collecting installation utilizing a plurality of bag type filters suspended within a housing wherein a manifold extends between opposed sidewalls of the housing and is rigidly fastened to intersecting wall stiffening members at their respective points of intersection.

BACKGROUND OF THE DISCLOSURE

Particles such as dust, ash and the like may conveniently be removed from air, gas or smoke streams by passing the stream through dust collecting installations known as "bag houses" which utilize tubular filtering elements called "bags" suspended within a housing. The filter bags are suspended from their upper ends, open at their lower ends, and fixed in position within the housing. The particle laden streams are induced to flow up and through the filter bags where the particles are entrapped in the interstices in the fiber from which the bags are produced and the cleansed fluid stream is thereafter recovered or released to the atmosphere.

Periodically, the filtering bags become so clogged with accumulated particles as to hinder and impede further passage of air therethrough, and at or before this saturation occurs the dust must be removed. During the cleaning process, the particles are loosened and allowed to drop to the bottom of the housing from which they may be removed. There are several methods by which the dust may be loosened from the bags, one being to direct a stream of air or gas at the suspended bags from the side thereby shaking the bags and causing a flexing motion in the bag walls which serves to overcome the bonding of the dust particle to the wall. Such a technique is described in U.S. Pat. 2,964,129.

In a typical filtering assembly of the type above described, substantial pressure differentials are generated between the housing interior and exterior. In this regard, it is not uncommon for a pressure differential of 20 inches of water to occur while the possible range of differentials may be between 5 and 40 inches. In order to enable the side and end walls of the housing to withstand these pressure differentials and not to deform thereunder, vertical and horizontal or vertical stiffeners are usually secured to the steel sheets from which the housing is formed. The size and spacing of the stiffeners in any particular installation are, of course, determined by a structural analysis of the housing utilized in that particular installation.

However, in all cases, these stiffeners add to the weight of the material from which the housing is fabricated thereby limiting its versatility of installation and also adding to the cost of the unit.

It is, therefore, a principal object of the present invention to reduce the number of structural members required to support the filtering assembly housing thereby resulting in a reduction in the weight of the installed unit and, consequently, a reduction in the cost of the unit.

SUMMARY OF THE INVENTION

These and other objects and advantages are most effectively attained by providing a dust collecting installation having spaced walls of sheet material defining a housing in which filter bags are suspended with a plurality of elongated intersecting stiffening members fastened to each of the walls in embracing and supporting relationship. A manifold, coupled to an air or gas source and adapted to direct a stream of the gas on the filtering bags during the bag cleaning phase of the cycle is disposed within the housing extending between the walls and rigidly fastened to the stiffening members at their respective points of intersection.

In this manner, the manifold in addition to performing its function of carrying the air for cleaning, becomes a structural strut tying into the diagonal stiffeners thereby eliminating the need for the prior art horizontal and vertical or vertical stiffening members.

DESCRIPTION OF THE DRAWINGS

Reference is now made to the drawings which illustrate the preferred embodiments of this invention and in which:

FIG. 1 is a side elevational view partly in section depicting an improved dust collecting apparatus constructed in accordance with the present invention;

FIG. 2 is a sectional view taken along the line 2—2 in the direction of the arrows in FIG. 1;

FIG. 3 is an elevational view similar to FIG. 1 taken along the line 3—3 in the direction of the arrows in FIG. 2;

FIG. 6 is a side elevational view taken along the line 6—6 in the direction of the arrows in FIG. 5; and FIG. 7 is an end elevational view taken along the line 7—7 in the direction of the arrows in FIG. 5.

DESCRIPTION OF THE PREFERRED EMBODIMENTS

Figure 5:
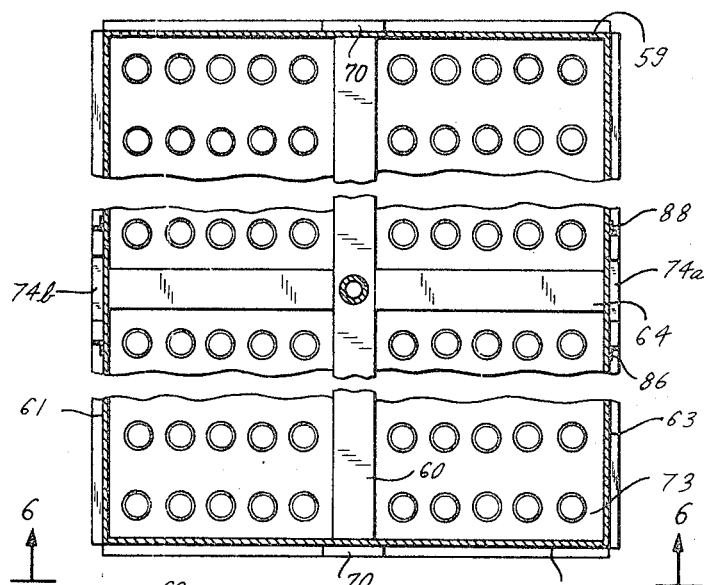
FIG. 5 is a planar sectional view taken along the line 5—5 in the direction of the arrows in FIG. 4.

Reference is made to the drawings and in particular to FIGS. 1, 2 and 3 wherein a dust collecting device 10 produced in accordance with the present invention is depicted. In this primary embodiment, the dust laden gas or air is delivered to the installation under pressure through the entry ducts 12 and 14 by the main fan 16 which is schematically represented in FIG. 1. The dust laden air is delivered into the filter bag compartments 18 and 20 and into one or more filtering bags 22 where the dust particles adhere to the bag material while the cleaned air passes therethrough and permitted to escape to the atmosphere through the roof opening 24. The progress of the air passing through the unit is generally depicted by the solid line flow arrows in FIG. 1.

An air shake fan 26 is provided on the roof 28 of the unit and serves to supply an air stream for cleaning the filter bags 22 in a manner to be described forthwith. The outlet of the fan is coupled to a downcomer 28 which, in turn, is coupled to a manifold 30 extending the entire width of the unit and adapted to provide air streams for shaking the filter bags in both compartments 18 and 20 during the bag cleaning portion of the cycle. In this regard, the manifold 30 may be provided with a plurality of nozzles (not depicted) disposed along its length adapted to direct the air shake stream at the individual bags 22 suspended within the compartments. In use, when the filtering bags have become so clogged with residue removed from the dust laden air during the filtering portion of the cycle as to make further dust removal impractical, the main fan 16 is shut down and the air shake 26 is activated. This causes air streams to impinge on bags 22 thereby imparting shaking and waving motion to the bags which causes a flexing of the filter material from which the bags are produced and, in turn, serves to overcome the binding of the dust particles to the filter cloth. The dust particles thus released from the filter bags drop to the base of the unit from where they are removed through a suitable opening which in this embodiment is controlled by the star valve 32. The movement of the dust particles during this bag cleaning phase of the filtering cycle is represented by the dotted arrows of FIG. 1.

It should be apparent that during the filtering operation there is a constant flow of heavily saturated dust laden air, which if not contained could be extremely harmful to personnel or equipment in the general vicinity. For this reason, as well as for purposes of making the most efficient use of the air moving devices utilized, the filtering compartments are contained within a housing 36 which is defined by walls 40 42, 44 and 46 and top and bottom members 28 and 54 respectively. The housing may be formed from any suitable material such as sheet steel. It should also be apparent that the sides of the housing must resist the pressure differentials generated by both the main fan during the filtering cycle and the air shake fan during the bag cleaning phases of the cycle, and that both the end direction and magnitude of the stresses which will be brought to bear against the walls will vary throughout the complete cycle. In order to assist the housing to withstand the pressure to which it is subjected a plurality of spaced vertical support members 38 or struts are fastened to the sidewalls 40 and 42 which extend parallel to the air shake manifold 30. The support members comprise angle irons, one side of which is secured to the wall by welding or other suitable means. The endwalls 44 and 46 are each supported by the intersecting diagonal struts 48 and 50 similarly formed of angle irons. A plate 52 is secured to the struts 48 and 50 at their intersection point and the manifold 30 which is located at the approximate vertical midway point of the housing extends the entire width of the housing and is rigidly secured at its ends to the opposed plates 52a and 52b thereby greatly adding to the rigidity of the housing and obviating the need for a plurality of supports (analogous to supports 38) disposed along the sidewalls of the housing. In addition, the manifold eliminates the need for horizontal supports extending along either the sidewalls or endwalls since the manifold carries any horizontal load applied. In the depicted embodiment the diagonal struts 48 and 50 and the plate 52 are all located on the housing exterior, however, it should be realized that this placement is not critical and that these support members could be placed within the housing.

Figure 4:
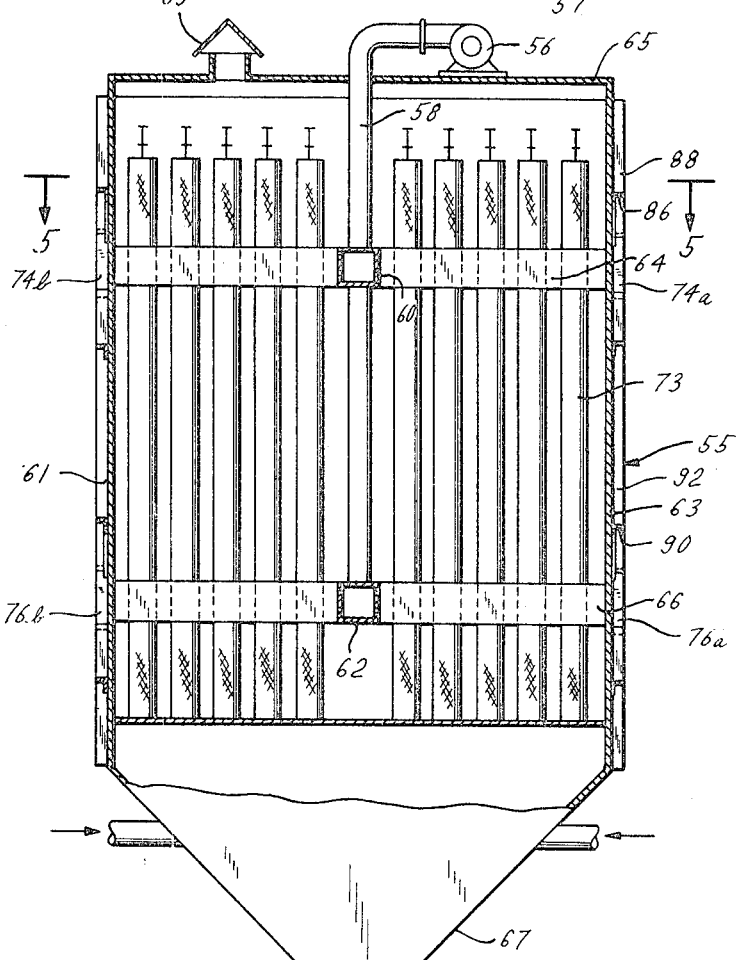
FIG. 4 is an elevational view partly in section depicting an alternate embodiment of a dust collecting device constructed in accordance with the invention.

Reference is now made to the remaining FIGS. 4 through 7 wherein an alternate embodiment of the present invention is depicted as including the same general arrangement of components as in the primary embodiment, except on a larger scale thus requiring a greater number of filter bag compartments and additional air shake manifolds. The dust collecting assembly 55 shown in FIG. 4 includes a housing defined by endwalls 57 and 59, sidewalls 61 and 63 and top and bottom members 65 and 67. As in the primary embodiment, the housing top is provided with an opening 69 adapted to permit clean air to escape to the atmosphere and the bottom 67 includes an opening 72 through which filter residue may be removed. An air shake fan 56 is mounted to the housing top and the output of the fan feeds into the downcomer 58 from which two longitudinally spaced tiers of intersecting manifold ducts extend. Manifolds 60 and 62 each extend the entire width of the housing (that is from endwall to endwall) and manifolds 64 and 66 extend the width of the housing affixed at each end to the opposed sidewalls. The filter bags 73 utilized in the present embodiment are suspended within the housing from their closed top ends and are arranged in a multiplicity of compartments the boundaries of which are defined by the housing walls and manifolds. The vertically spaced arrangement of double level manifolds serves to more vigorously shake and flex the filter bags than could be obtained with a single air shake manifold thereby more effectively removing the dust particles from the filtering fabric during the cleaning portion of the cycle.

Reference is now made to FIGS. 6 and 7 wherein the wall support arrangement is depicted. As in the primary embodiment, all the air shake manifolds completely extend across the housing and are rigidly coupled to end plates at their points of intersection with the housing wall. Thus, in FIG. 6, the ends of ducts 60 and 62 are shown abutting plates 70 and 72 respectively which are generally positioned at the respective intersection points of diagonal strut members 78, 80, 82 and 84. Likewise, FIG. 7 shows manifolds 64 and 66 abutting against end plates 74 and 76 which are positioned at the respective intersection points of diagonal support struts 86, 88, 90 and 92. As in the primary embodiment, the diagonal struts 78, 80, 82, 84, 86, 88, 90 and 92 embrace the housing walls in a supporting and stiffening relationship and comprise angle irons, one side of which is welded to the wall. It should be apparent that since both the end and sidewalls in this embodiment are supported by the cooperating diagonal struts and manifolds, the need for vertical or vertical and horizontal struts for the housing is completely obviated with a resultant savings in weight and cost over comparable sized units the walls of which are supported in a conventional manner.

It should be understood that modifications may be made in the illustrated and described embodiments of the invention without departing from the invention as set forth in the accompanying claims.

We claim:

1. In a dust collecting housing providing a bag chamber, a plurality of filter bags suspended within said chamber in parallel disposed relationship with their longitudinal axes substantially vertical, spaced housing inlet and outlet means, means for passing a gas to be filtered through said housing inlet means into said bags and said outlet means, substantially rigid opposed walls defining said housing, a rigid manifold duct extending between the filter bags and said walls in a zone intermediate the tops and bottoms of said filter bags, elongated stiffening struts connected to and extending diagonally across each of said opposed walls, said manifold duct being rigidly secured to said walls at the points of intersection with said struts, a plurality of spaced openings formed in side walls of said manifold duct to allow air to impinge on said bags, air shake fan means and duct means connected between said air shake fan means and said manifold duct.

2. In a dust collecting housing providing a bag chamber, a plurality of filter bags suspended within said chamber in parallel disposed relationship with their longitudinal axes substantially vertical, spaced housing inlet and outlet means, means for passing a gas to be filtered through said housing inlet means into said bags and said outlet means, substantially rigid opposed walls defining said housing, first and second vertically spaced rigid manifold ducts extending between the filter bags and said walls intermediate the tops and bottoms of said filter bags, first and second elongated stiffening struts which intersect connected to and extending across each of said opposed walls, said manifold ducts being respectively rigidly secured to said walls at the points of intersection with said respective struts, first and second plurality of spaced openings formed respectively in side walls of said first and second manifold ducts to allow air to impinge on said bags, air shake fan means and duct means connected between said air shake fan means and said manifold ducts.

References Cited

UNITED STATES PATENTS

| | | | |
|---|---|---|---|
| 941,068 | 11/1909 | Frame et al. | 52—629 |
| 1,230,567 | 6/1917 | Comee | 52—629 |
| 1,427,120 | 8/1922 | Nelson | 52—630 |
| 2,964,129 | 12/1960 | Labbe | 55—293 |
| 3,266,225 | 8/1966 | Barr | 55—293 |
| 3,375,641 | 4/1968 | Labbe | 55—293 |
| 3,377,783 | 4/1968 | Young | 55—341 |
| 2,656,157 | 10/1953 | Wasielewski | 165—174 |
| 2,804,168 | 8/1957 | Church | 55—96 |
| 2,878,529 | 3/1959 | Dupler | 52—220 |

FOREIGN PATENTS 795,199  5/1958  Great Britain.

OTHER REFERENCES

Albany Felt Co. Air Filter. In Chemical Engineering, vol. 72, Issue 14, p. 84, July 5, 1965.

Northern Blower Division Buell Engineering Co., Inc. Shakerless Dust Arresters, Bulletin No. 168, pp. 1–6, May 4, 1966.

FRANK W. LUTTER, Primary Examiner

B. NOZICK, Assistant Examiner

U.S. Cl. X.R.

55—341